United States Patent [19]

English et al.

[11] Patent Number: 5,345,575
[45] Date of Patent: Sep. 6, 1994

[54] WRITE OPTIMIZED DISK STORAGE DEVICE

[75] Inventors: Robert M. English; Alexander A. Stepanov, both of Palo Alto, Calif.

[73] Assignee: Hewlett-Packard Company, Palo Alto, Calif.

[21] Appl. No.: 767,109

[22] Filed: Sep. 26, 1991

[51] Int. Cl.⁵ .......................................... G06F 13/00
[52] U.S. Cl. .................................................. 395/425
[58] Field of Search ............................. 395/425; 364/200 MS File, 900 MS File

[56] References Cited

PUBLICATIONS

Farr et al., An optimum disk organization for a virtual memory system, Computer Design, vol. 10, No. 6, pp. 49–54, Jun. 1971.
Krumm, Inside the Norton Utilites ™, pp. 341–346, 1988.

*Primary Examiner*—David L. Robertson

[57] ABSTRACT

An indirectly accessed disk storage device comprises a rotating disk memory coupled to an intelligent disk controller. The intelligent disk controller responds to a request to store a packet of data by determining which storage location of the rotating disk memory are available and by selecting from among the available locations a location that can be accessed in a minimum amount of time relative to access time of any other available location. The intelligent disk controller makes its selection dynamically by monitoring the current position of the recording head of the rotating disk memory and by searching a record of available locations to select an optimal location. The intelligent disk controller then stores the packet of data on the rotating disk memory. By optimizing such data write operations, the indirectly accessed disk storage device also effectively optimizes data read operations. The indirectly accessed disk storage device also improves disk performance by reshuffling data stored on the rotating disk memory according to these policies during idle periods.

12 Claims, 6 Drawing Sheets

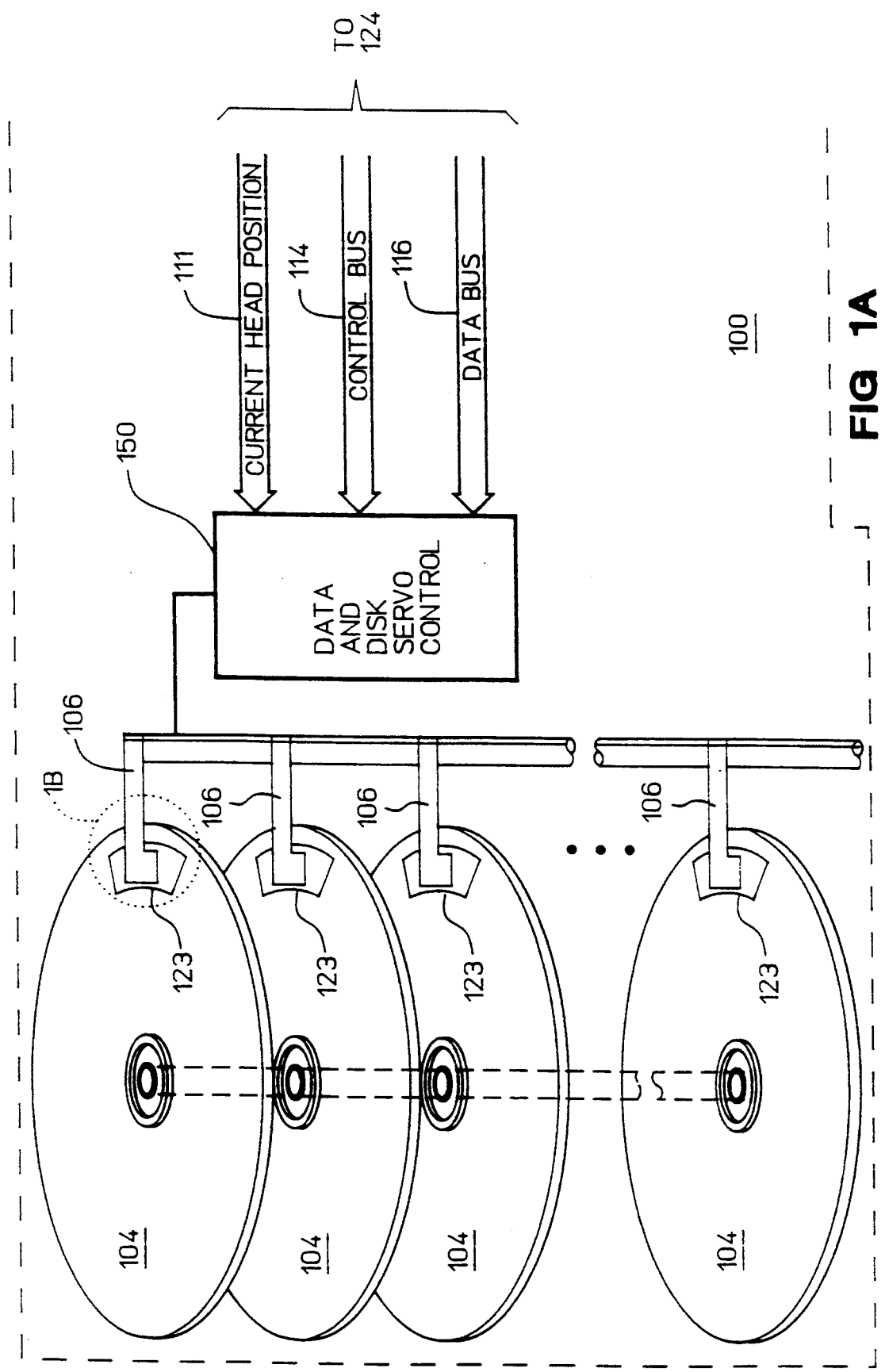

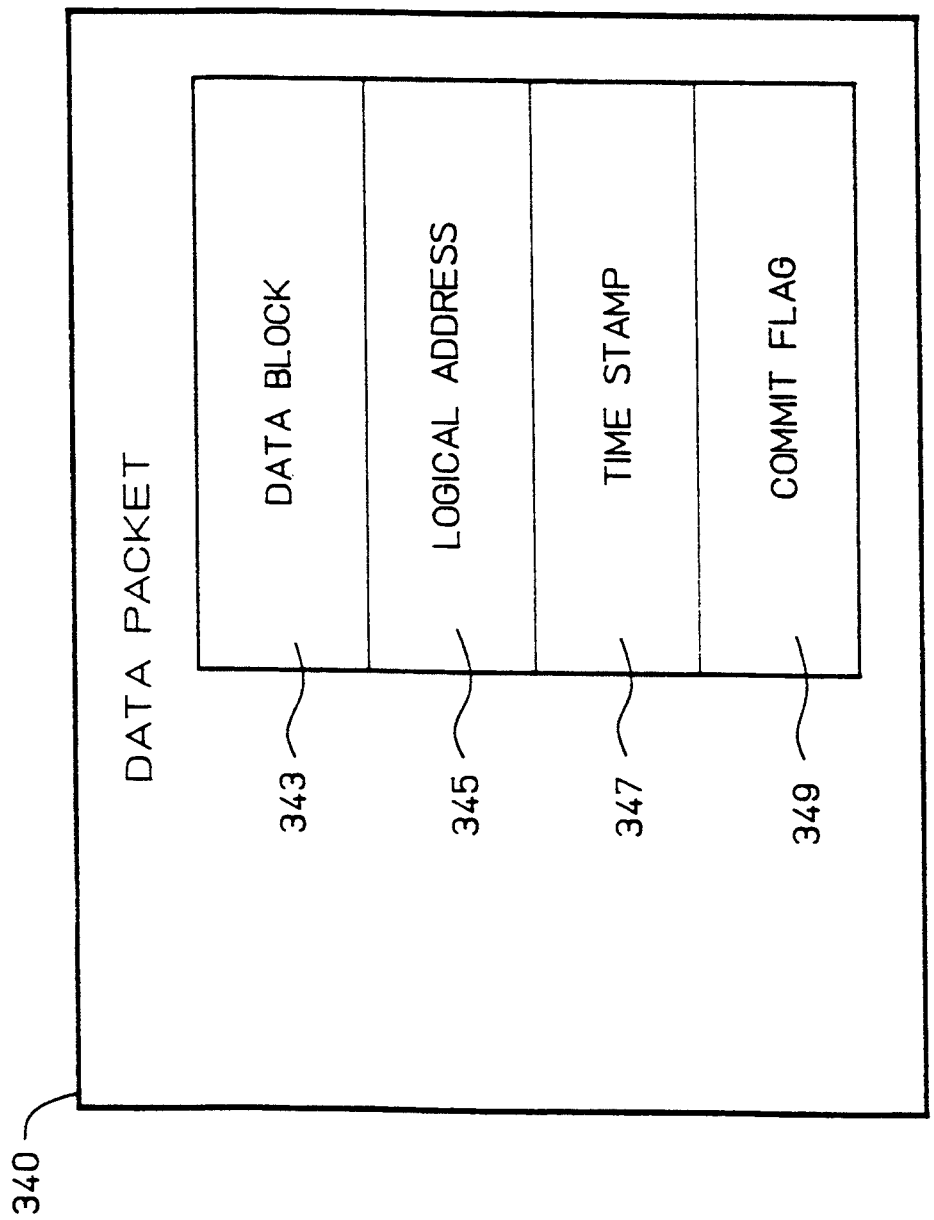

WRITE OPTIMIZED DISK STORAGE DEVICE

BACKGROUND OF THE INVENTION

Traditionally the task of organizing the data on a storage medium such as a rotating disk memory has been played by the file system of a host processor. While system-level software has a theoretical advantage in taking advantage of global information, some barriers to optimization remain. Files are individually optimized to be in localized address ranges, but global load balancing or file system placement is often left to system administrators, perhaps aided by tools such as the OSF Logical Volume Manager which rearrange the low-level structure of a disk. In addition, new disk interfaces such as SCSI-II (Small Computer System Interface II) present an abstract disk model, making it more and more difficult for the file system to make these kind of decisions.

It is the teaching of the prior art that the file system (whether part of an operating system, a database system, or some other application) has more information on the global system state than the controller, and that it is this information that should be used to improve choices about scheduling, data placement, caching, and prefetch policies. The 4.2BSD file system (McKusick84), for example takes advantage of global information, but lacks the knowledge of current disk structure to handle non-rectangular disks. Such systems lack the advantages of fine-grained control and improved knowledge of disk performance characteristics available at the controller level.

Being removed from the disk and disk controller, the host processor is less able to determine optimal data layouts than the disk controller. The host processor lacks the knowledge of disk geometry and performance characteristics that is present as a natural part of controller design and is vital for correct decisions on data layout. Under present interface standards this knowledge can be communicated to the host processor only with great difficulty. Detailed knowledge of the current disk state (including the current head position) that is important for scheduling decisions in allocating disk resources, is more naturally available to the controller. Despite this, it is the teaching of the prior art to use the file system of a host processor to make scheduling and data placement decisions.

SUMMARY OF THE INVENTION

The present invention is an indirectly accessed disk storage device based on the premise that the disk controller is better suited to determining data placement than the file system because the disk controller is better able to make optimal data placement decisions. The indirectly accessed disk storage device makes extensive use of an intelligent controller processor, inverted tables, and indirection to achieve the objectives of high performance and reliable operation, as well as to provide an extension to existing disk interfaces which enhances cooperation between file systems and storage devices.

The present invention allows the disk controller to rearrange the disk on every write operation without metadata updates. This is accomplished by keeping an indirection table in controller memory as an assignment record mapping logical addresses to labels. The logical addresses are used by the file system of the host processor to identify data blocks. Labels are used by the disk controller to identify locations on the disk where the data blocks are stored. To provide for failure recovery if the assignment record is lost, the data block is packaged along with the logical address, a current time stamp, and a commit flag in a data packet for storage on the disk. Using commit flags in packets provides for atomic, multi-block updates.

The indirectly accessed disk storage device improves disk performance and effectively reduces the performance impact of the latency normally inherent in mass storage devices. The present invention writes data packets to the available storage location that can be accessed in a minimum amount of time, relative to access time of any other available location. In this way, write operations are completed in a minimum amount of time and write performance is optimized. By optimizing write performance, read performance is also optimized. By preserving a minimum pool of available storage locations the present invention insures that when a write occurs, a nearby segment is available. The present invention also reshuffles data on the disk during idle periods to improve read performance.

Other aspects and advantages of the present invention will become apparent from the following detailed description, taken in conjunction with the accompanying drawings, illustrating the principles of the invention.

BRIEF DESCRIPTION OF THE DRAWINGS

FIGS. 1A and 2 are one drawing shown on two sheets that shows an indirectly accessed disk storage device according to the present invention coupled to a host processor.

FIG. 3C shows a data packet. The data packet is stored at the selected storage location shown in FIG. 1B.

DETAILED DESCRIPTION OF THE PREFERRED EMBODIMENT

Figure 3A:
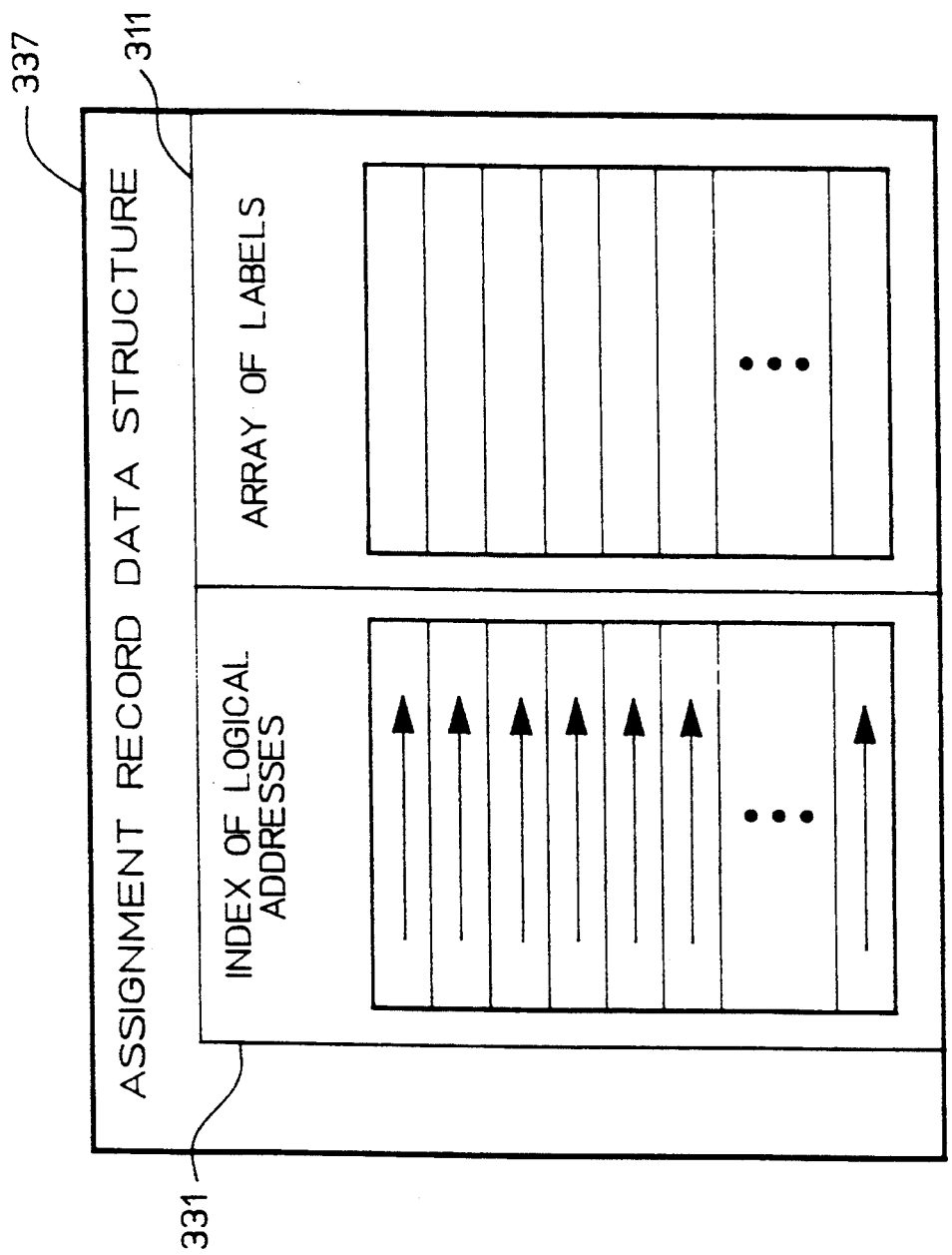
FIG. 3A shows an assignment record data structure. The assignment record data structure corresponds to an assignment record shown in a data memory of FIG. 2.

As indicated previously, the present invention treats the logical addresses used by the file system of the host processor as data identifiers rather than as actual disk addresses, and stores the data on the disk according to its own optimization policies. To do this, the present invention maintains its own metadata structures in controller memory, separate from storage medium and the operating system of the host processor. These structures are frequently updated and allow the present invention to map the host's logical addresses into available labels identifying available storage locations. The assignment record data structure (337) that contains the actual mapping is shown in FIG. 3A. The usage record data structure (317) shown in FIG. 3B allows available labels identifying available storage locations to be found quickly by using record words whose word length reflects the number of recording heads in the rotating disk memory. The data packet (340) shown in FIG. 3C encapsulates data on the rotating disk memory for failure recovery purposes.

In general, when the host processor requests to store a block of data, the present invention scans the usage record data structure to select from the available labels a designated label identifying the location that can be accessed in a minimum amount of time relative to access time of any other available location. A data packet containing the block of data is then stored at the selected location. The designated label identifying the selected location is then recorded in the assignment record data structure at a location specified by the logical address. The designated label is independent of any old label formerly associated with the logical address in the assignment record data structure. After the data is written, any old label formerly associated with the logical address is then made available for future data storage.

A stream of data blocks from the host processor is written as a sequence of data packets. Each packet contains a chunk of data, its logical block address, a sequence number, and a flag indicating whether the packet terminates an atomic sequence. This extra information allows the present invention to recover from system failures and provides atomic updates of multiple block objects.

To ensure that a storage location is always available soon after a data storage request from the host processor, the present invention reserves a fraction of storage for future allocation. The likelihood of finding an available storage location soon after a data storage request decreases as the number of available segments decreases. However, the amount of reserved storage needed to achieve excellent performance is surprisingly low. While maintaining a reserve of five percent, the present invention allows a sustained throughput at about half the nominal disk bandwidth. While maintaining a reserve of fifty percent reserve, the present invention allows a sustained throughput at speeds approaching the nominal disk bandwidth. These throughput numbers are independent of whether the blocks transferred are sequential or random.

Figure 2:
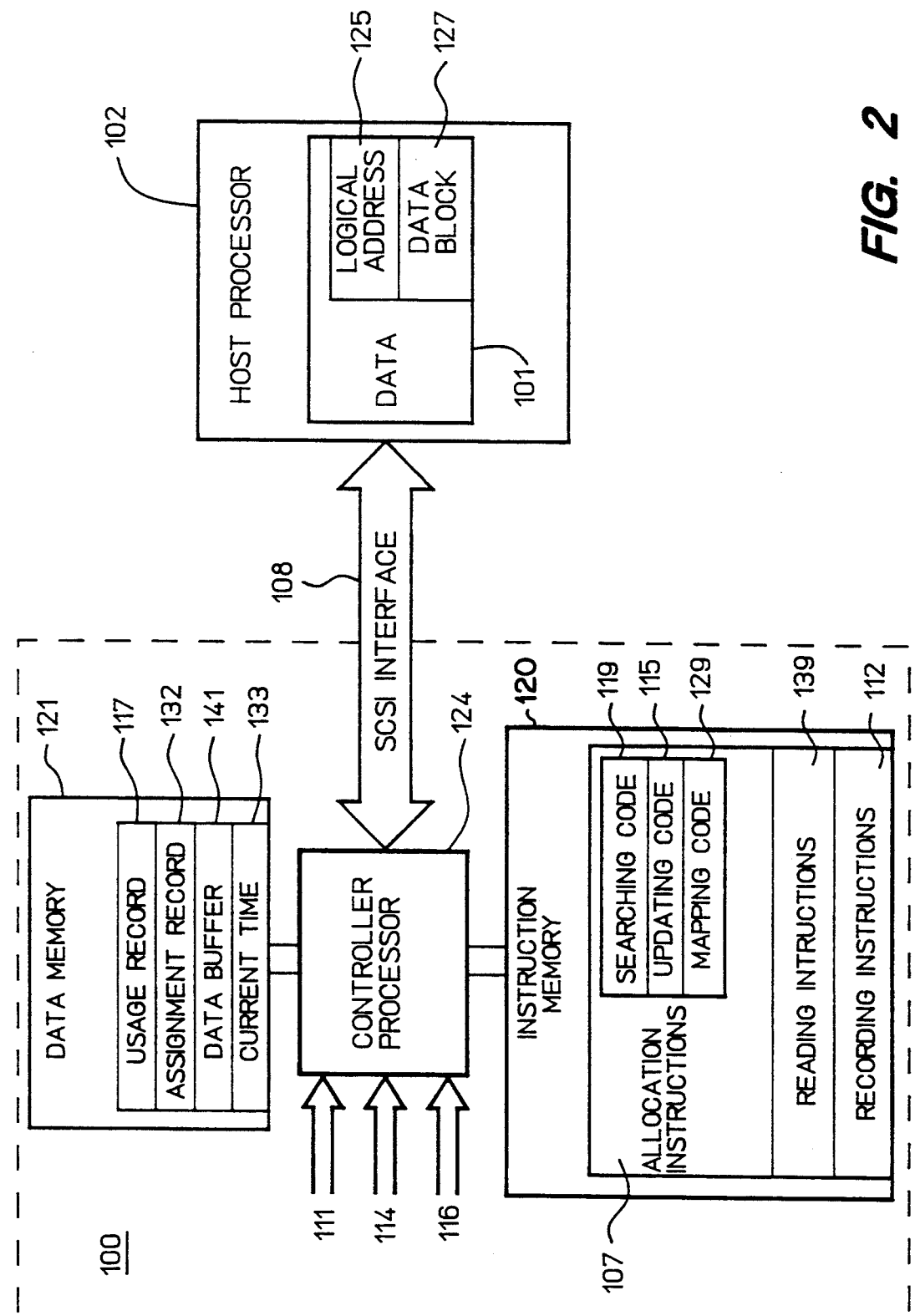

A more detailed description of the operation of the preferred embodiment is shown in FIG. 2. The disk controller processor (124) operates by executing programming instructions stored in the instruction memory (120). The host system (102) communicates with the disk controller processor (124) through a SCSI interface (108) (Small Computer System Interface). Using the SCSI interface (108), the host system requests that the indirectly accessed disk storage device (100) store data (101). The host system then passes a packet of data comprising a logical address (125) and a data block (127) to the disk controller processor (124) through the SCSI interface (108).

The disk controller processor (124) then executes allocation instructions (107), shown in FIG. 2. The allocation instructions determine which of the locations (105) of the storage medium (104), shown in FIG. 1A, are available for data storage and select from among the available locations a location that can be accessed in a minimum amount of time relative to access time of any other available location. While the processor (124) is executing allocation instructions, the processor (124) is in communication the Data and Disk Servo Control (150), to monitor the current head position (111) of the magnetic recording heads (106), as shown in FIG. 1A. The processor uses this information about the current head position (111) in selecting from among the available locations a location that can be accessed in a minimum amount of time relative to access time of any other available location.

Figure 1B:
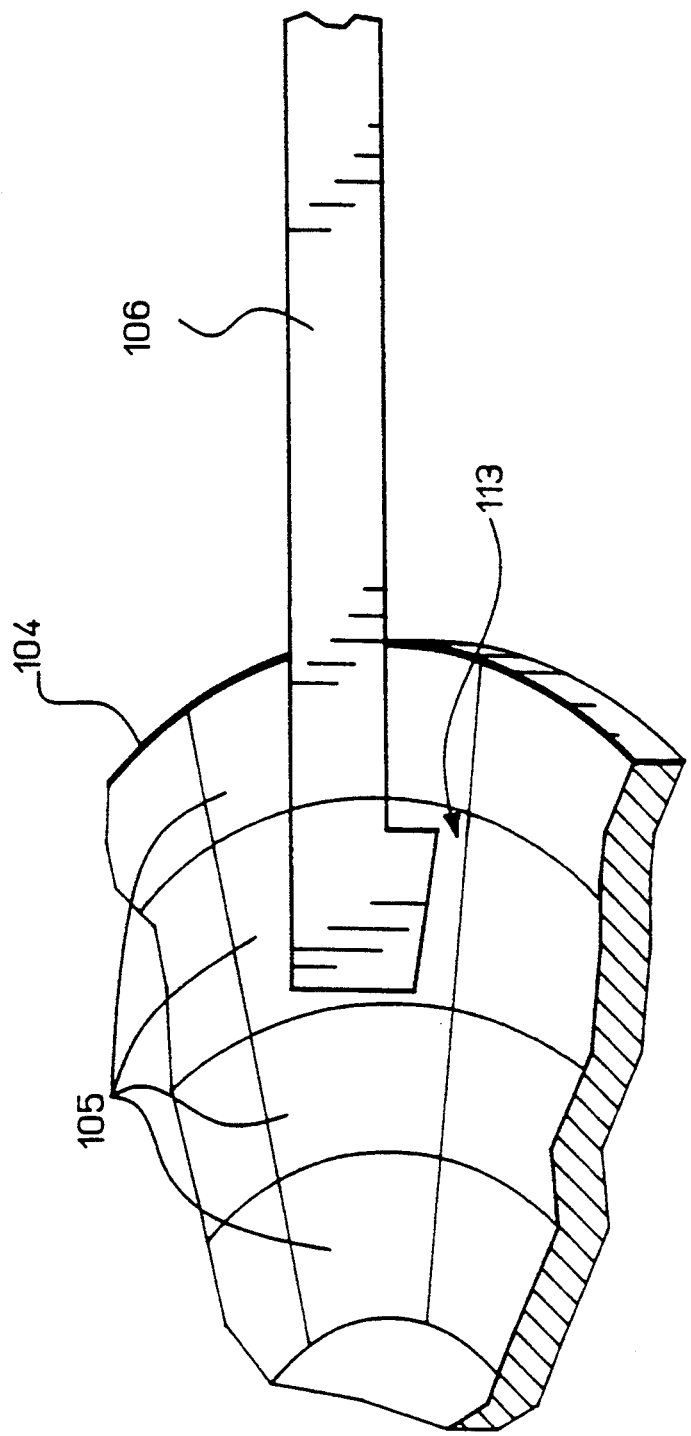
FIG. 1B is a close up view of a portion of the indirectly accessed disk storage device as marked in FIG. 1A. The close up view of FIG. 1B shows a selected storage location.

The disk controller processor (124) then executes recording instructions (112) for recording the packet of data on the storage medium (104) in the selected location (113) shown in FIG. 1B. (The allocation instructions (107) and the recording instructions (112) are discussed later in greater detail with references to routines in APPENDIX I: MAIN PSEUDOCODE LISTING which appears as the end of the specification.) The disk controller processor (124) then stores the packet of data on the storage medium (104) by sending the appropriate signals to the Data and Disk Servo Control (150) through the connecting control bus (114) and data bus (116) shown in FIG. 1A.

In the preferred embodiment the storage medium (104) is a rotating disk memory having a plurality of platters (104), shown in FIG. 1A. The storage locations (105) shown in FIG. 1B are segments of concentric rings on the surface of one of the platters (104). A similar arrangement appears on each of the platters. The concentric rings are known as cylinders. Any particular segment is located by its surface, cylinder position, and rotational position. Magnetic recording heads (106) are ganged together with each platter surface having one magnetic recording head (106). The ganged magnetic recording heads (106) move together, radially scanning the platters (104). The platters (104) rotate as the ganged magnetic recording heads (106) scan the surface of each platter, allowing the magnetic recording heads (106) to access the storage locations (105). A location that is already directly beneath one of the magnetic recording heads may be accessed quickly. If a particular location is not already directly beneath one of the magnetic recording heads (106), there is a delay in accessing the particular location while waiting for the disk to rotate and the magnetic recording head to scan so that the particular location is brought directly beneath one of the magnetic recording heads (106). Because of this delay, locations that are near the current head position (111) may be accessed in less time than locations that are far from the current head position (111). This delay relates to the larger concept of latency.

In the context of disk writes, latency is the amount of time it takes to perform the disk write operation. This includes the time to move the magnetic recording head (106) into position, known as seek time; the time for the disk to rotate into position, known as rotational delay; and the time to actually transfer the data. This concept of latency is applicable to many types of rotating disc memories as well as to other mass storage devices. By monitoring the current head position (111) of the magnetic recording heads (106) and searching the assignment record (132), the controller processor (124) selects from among the available locations a location that can be accessed in a minimum amount of time relative to access time of any other available location. Such placement decisions must be made dynamically because the current head position (111) is constantly changing due to rotation of the disk platters (104) and motion of the magnetic recording heads (106).

In this way the present invention effectively reduces the performance impact of seek time and rotational delay, normally inherent in rotating disk memories. This in turn reduces the performance impact of latency. The present invention is likewise applicable to other mass storage devices having latency.

As indicated above, at any given instant in time each magnetic recording head (106) is positioned directly over one location, allowing access to that location. Since any one of the gang of recording heads (106) may be utilized at such an instant in time, each platter surface contributes one location to a set of locations; any one of the locations within the set being accessible in the same instant of time. Because the magnetic recording heads (106) are ganged together, each member of such a set of locations is at the same rotational position on the same cylinder, relative to the surface of the associated platter. Because the platters (104) are stacked, each member of such a set of locations lie in a column extending down through the stack of platters (104). As a result, such a set of locations is referred to as a column grouping of locations (123). For example, a disk with 32 Kilobyte tracks, 19 data surfaces, and a storage location size of 4 Kilobytes, would have 152 storage locations within a cylinder, organized in 8 column groupings with 19 storage locations in each.

Figure 3B:
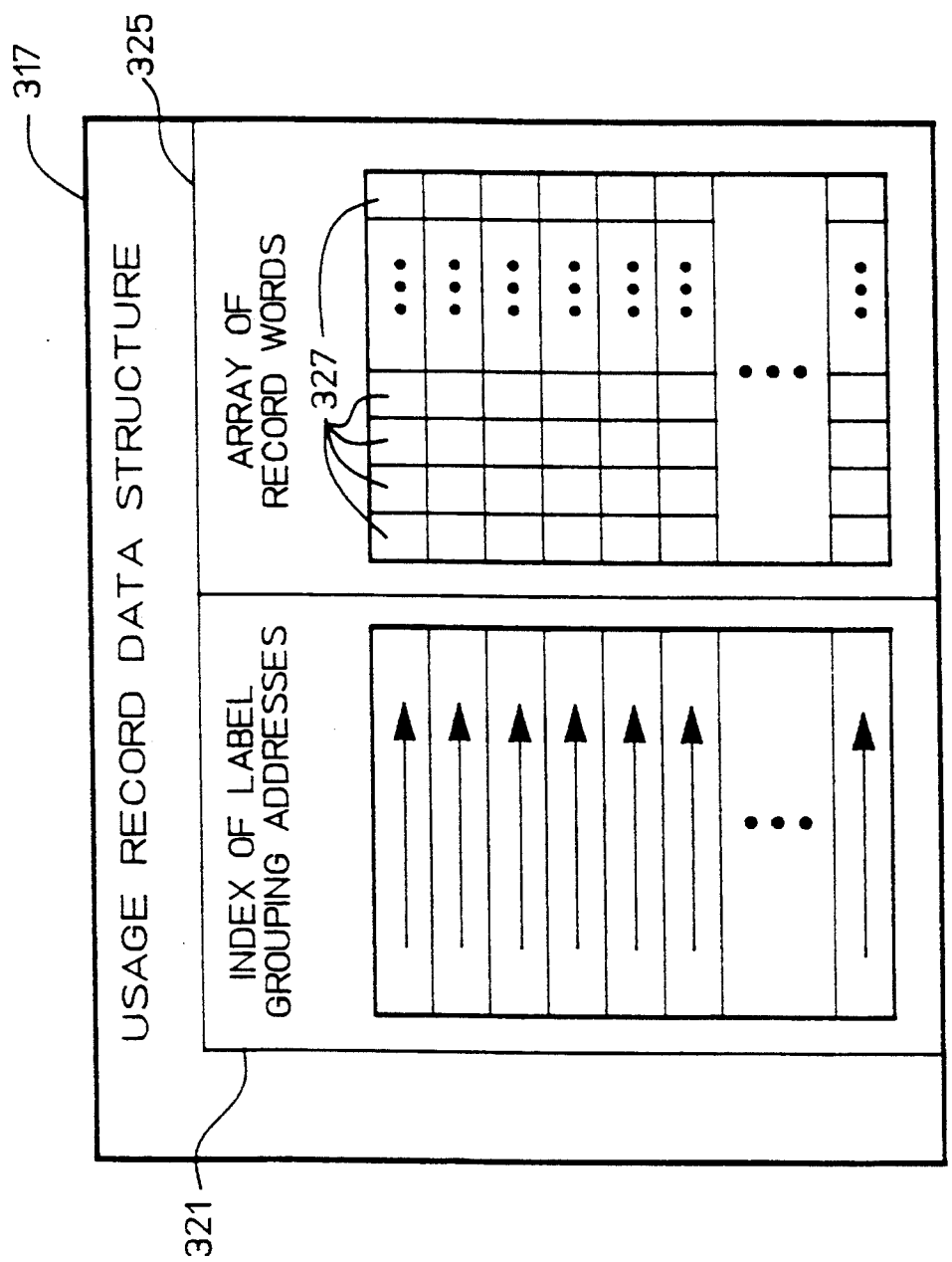
FIG. 3B shows a usage record data structure. The usage record data structure corresponds to a usage record shown in the data memory of FIG. 2.

FIG. 3B shows the usage record data structure (317) having an array of record words (325) and an index of label grouping addresses (321). Each of the label grouping addresses in the index corresponds to one column grouping of locations (123) as shown in FIG. 1A. (As shown in FIG. 2, the controller processor (124) maintains within a data memory (121) a usage record (117) indicating which of the locations (105) on the storage medium (104) are available for data storage and which locations are unavailable for data storage). FIG. 3B shows the location of each of the record words within the array (325) is indexed by one of the label grouping addresses. In this way, the usage record data structure (317) is constructed to allow the controller processor (124) to access the usage record (117) by using one of the label grouping addresses (321) to obtain the corresponding one of the record words (325).

Each of the record words in the array (325) has a number of bit positions (327). An entry in each bit position (327) indicates the availability of one of the locations (105) of the storage medium (104). Each of the locations (105) is identified by a label. Each label comprises a label grouping address and a bit position. The label grouping address portion of a label specifies the cylinder position and the rotational position of the location (105). The bit position portion of the label specifies the platter surface of the location. The cylinder position, rotational position, and platter surface portions each correspond to addr_to_cyl(request.address), addr_to_sect (request.address), and addr_to surf- (request.address), respectively, shown on lines 63-64 of APPENDIX I: MAIN PSEUDOCODE LISTING. The usage record data structure (317) corresponds to free_map shown in APPENDIX II: PAGE ALLOCATION STRUCTURES PSEUDOCODE LISTING. The appendices appear as the end of the specification.

As mentioned above, the disk controller processor (124) executes allocation instructions (107) to determine which of the locations (105) of the storage medium (104) are available for data storage and to select from among the available locations a selected location that can be accessed in minimum amount of time relative to access time of any other available location. In doing this, the controller processor (124) monitors the current head position (111) while executing searching code (119) that searches the usage record (117) to produce a designated label that identifies the selected location (113). The searching code (119) corresponds to find_ free_segment() shown on line 221 of APPENDIX I: MAIN PSEUDOCODE LISTING.

Once the execution of the searching code (119) has produced the designated label, the controller processor then executes the recording instructions (112) to move data from temporary storage in the data buffer (141) portion of the data memory (121), to encapsulate data into a data packet, and to store the entire data packet on the storage medium (104). The recording instructions (112) correspond to do_io(phys_req, last) shown on line 275 of APPENDIX I: MAIN PSEUDOCODE LISTING.

The controller processor (124) maintains a value for current time (133) in the data memory (121). During the encapsulation of the data packet this current time (133) is included in the data packet along with the logical address (125) and the data block (127) to provide for a back up for system failure recovery. The indirectly accessed disk storage device (100) also provides for atomic data updates of arbitrary size by also including a commit flag in the data packet. This commit flag indicates that all updates with lower sequence numbers should be applied when reconstructing the assignment record during system failure recovery. The commit flag also allows the indirectly accessed disk storage device (100) to engage in multiple simultaneous transactions. FIG. 3C shows the data packet (340) including the data block (343), the logical address (345), the time stamp (347) and the commit flag (349).

In addition to searching code (119), the allocating instructions (107) also include mapping code (129) and updating code (115). By executing the mapping code (129), the controller processor stores in the data memory (121) an assignment record (132) of an association between the designated label and the logical address (125) of the data (101) stored. FIG. 3A shows the assignment record data structure (337) comprising an array of labels (311). The location of each label in the array is indexed by the index of logical addresses (331). In this way, the assignment record data structure (337) is constructed to allow the controller processor (124) to access the assignment record (132) by using the logical address (125) and the index of logical addresses (331) to store the designated label in the array of labels (311). The mapping code writes over any old label already at this location in the array of labels (311) and stores the designated label as the new label. The mapping code (129) corresponds to store_loge_map(start_address, request) shown on line 183 of APPENDIX I: MAIN PSEUDOCODE LISTING.

After data is stored in the selected location, the controller processor (124) executes the updating code (115), updating the usage record (117) with an entry to show the selected location (113) has become unavailable. This is done using the label grouping address portion of the designated label to locate the corresponding record word in the array of record words (325). The bit position portion of the designated label is then used to locate the bit position in the corresponding record word for the entry. This is done by allocate shown around line 105 of APPENDIX I: MAIN PSEUDOCODE LISTING.

The updating code (115) also uses the logical address to locate the old label in the array of labels (311) before the mapping code writes over the old label with the designated label. The updating code (115) then uses the old label to update the usage record (117) with an entry to show the location identified by the old label has become available. This is done using the label grouping address portion of the old label to locate the corresponding record word in the array of record words (325). The bit position portion of the old label is then used to locate the bit position in the corresponding record word for the entry. This is done by free shown around line 206 of APPENDIX I: MAIN PSEUDO-CODE LISTING.

As discussed above, the allocating instructions (107) and the recording instructions (112) are executed by the controller processor (124) for storing data from the host (102). The indirectly accessed disk storage device (100) also reorganizes the storage medium during idle periods (prolonged periods when the host is not making demands on the indirectly accessed disk storage device (100)). This is done by the controller processor (124) first executing reading instructions (139) to transfer data (101) from the storage medium to the data buffer (141). The controller processor (124) then executes allocation instructions (107) and recording instructions (112) to transfer the data (101) in data buffer (141) back to the storage medium (104). This is discussed in greater detail in APPENDIX III: DISK SHUFFLING PSEUDO-CODE LISTING.

As described above in detail, an indirectly accessed disk storage device according to this invention is capable of improving disk performance and effectively reducing the performance impact of latency normally inherent in rotating disk memories. From the foregoing description of the preferred embodiment of the invention, it will be apparent that many modifications may be made therein. It should be understood that the appended claims are intended to cover all modifications that fall within the true spirit and scope of the invention.

What is claimed is:

1. An apparatus for storing data comprising:

a storage medium characterized by column groupings of data storage locations, within any one of the column groupings all locations being accessible in similar amounts of time;

means for assigning a respective label grouping address to identify each of the column groupings;

means, responsive to a request to store a packet of data, for selecting one of the label grouping addressees; and means for recording the data at a location within a column grouping identified by the selected address.

2. An apparatus as in claim 1 wherein:

the selecting means includes means for determining which one of the column groupings is accessible in a minimum amount of time relative to access time of any other column grouping; and the selected address identifies the column grouping accessible in the minimum amount of time.

3. An apparatus as in claim 1 wherein:

the selecting means includes:

means for determining which locations are available for storing data; and means for selecting from among the available locations a location that is accessible in a minimum amount of time relative to access time of any other available location; and the recording means is adapted for recording the data at the selected location.

4. An apparatus for storing data comprising:

a storage medium having a plurality of data storage locations;

a head adjacent to the storage medium for accessing the locations, the head having a current head position relative to the locations;

means for monitoring the current head position;

means, responsive to the current head position and to a request to store a packet of data, tier determining which of the locations are nearest to the current head position;

means for determining which of the locations that are nearest to the current head position are available for data storage;

means for selecting an available location that is nearest to the current head position; and means for recording the data at the selected location.

5. An apparatus as in claim 4 wherein:

the locations of the storage medium are characterized by column groupings of the locations, within any one of the column groupings the locations being adjacent to one another and accessible in similar amounts of time; and the means for determining which of the locations are nearest to the current head position includes a means for determining which one of the column groupings is nearest to the current head position.

6. A method for storing data comprising:

providing a storage medium having a plurality of data storage locations and further providing a head adjacent to the storage medium for accessing the locations, the head having a current head position relative to the locations;

monitoring the current head position;

determining which of the locations are nearest to the current head position in response to the current head position and to a request to store a packet of data;

selecting one of the locations that are nearest to the current head position; and recording the data at the selected location.

7. A method as in claim 6 wherein the selecting step includes:

determining which of the locations that are nearest to the current head position are available for data storage; and selecting an available location that is nearest to the current head position.

8. A method as in claim 6 wherein:

the storage medium is a disk storage device having a disk bandwidth; and the method further includes providing a reserve of available storage locations sufficient for recording data at approximately half of the disk bandwidth.

9. A method as in claim 6 wherein:

the storage medium is a disk storage device having a disk bandwidth; and the method further includes providing a reserve of available storage locations sufficient for recording data at approximately the disk bandwidth.

10. An apparatus for storing data comprising a storage medium characterized by column groupings of data storage locations, within any one of the column groupings the locations being accessible in similar amounts of time;

means, responsive to a request to store a packet of data, for selecting one of the column groupings;

means for determining which of the locations are available for data storage;

means for selecting an available location within the selected column grouping;

means for recording the data at the selected location within the selected column grouping; and means for providing a reserve of available storage locations within the column groupings.

11. An apparatus as in claim 10 wherein:

the storage medium is a disk storage device having a disk bandwidth; and the reserve is sufficient to provide data recording at approximately half of the disk bandwidth.

12. An apparatus as in claim 10 wherein:

the storage medium is a disk storage device having a disk bandwidth; and the reserve is sufficient to provide data recording at approximately the disk bandwidth.

* * * * *